United States Patent [19]
Gleim

[11] Patent Number: 5,327,054
[45] Date of Patent: Jul. 5, 1994

[54] CONTROLLING ELECTRONICALLY COMMUTATED MOTOR

[75] Inventor: Günter Gleim, Villingen, Fed. Rep. of Germany

[73] Assignee: Deutsche Thomson-Brandt GmbH, Villingen-Schwenningen, Fed. Rep. of Germany

[21] Appl. No.: 915,351

[22] Filed: Jul. 23, 1992

Related U.S. Application Data

[63] Continuation of PCT/ED90/02225, Dec. 18, 1990.

[30] Foreign Application Priority Data

Dec. 20, 1989 [DE] Fed. Rep. of Germany ....... 3942003

[51] Int. Cl.[5] .............................. H02P 1/00
[52] U.S. Cl. ..................... 318/255; 318/254; 318/439; 318/139
[58] Field of Search ............... 318/255, 254, 439, 139

[56] References Cited

U.S. PATENT DOCUMENTS

| | | | |
|---|---|---|---|
| 4,295,085 | 10/1981 | Lafuze | 318/721 |
| 4,677,356 | 6/1987 | Tsuneda et al. | 318/254 |
| 4,703,236 | 10/1987 | Janssen | 318/254 |
| 4,743,815 | 5/1988 | Gee et al. | 318/254 |
| 4,749,294 | 6/1988 | Barrus et al. | 318/254 |
| 5,157,311 | 10/1992 | Hara et al. | 318/254 |

FOREIGN PATENT DOCUMENTS 1374625 11/1974 United Kingdom .

OTHER PUBLICATIONS

Patent Abstracts of Japan, vol. 11, No. 36 (E-477) (2483) Feb. 3, 1987.
Patent Abstracts of Japan, vol. 11, No. 110 (E-496) (2557) Apr. 7, 1987.
Patent Abstracts of Japan, vol. 9, No. 225 (E-342) (1948) Sep. 11, 1985.
Patent Abstracts of Japan, vol. 7, No. 226 (E-202) (1371) Oct. 7, 1983.
Patent Abstracts of Japan, vol. 9, No. 189 (E-333) (1912) Aug. 6, 1985.

*Primary Examiner*—William M. Shoop, Jr.
*Assistant Examiner*—Karen Masih
*Attorney, Agent, or Firm*—Joseph S. Tripoli; Joseph J. Laks; Harvey D. Fried

[57] ABSTRACT

An electronically commutated motor is controlled by controlling the winding current of the motor. During an operational mode change of the motor, the winding current is first changed to a value in excess of the value needed to maintain a measured motor parameter at a desired level. When the desired level of the parameter is reached the current is changed to the value needed to maintain the parameter at the desired level. In addition, the communication time of the motor is shifted such that the temporal maximum of the magnetic field of the motor coincides with the position of the motor poles which results in attainment of a maximum speed altering force.

21 Claims, 2 Drawing Sheets

CONTROLLING ELECTRONICALLY COMMUTATED MOTOR

This is a continuation of PCT application PCT/EP90/02225 filed Dec. 18, 1990 by Gunter Gleim and titled "Process And Device For Controlling An Electronically Commutated Motor".

Electrical appliances which are motor driven, for example, a tape deck or VCR, compact disc or head drive, have the problem of setting different operating modes as rapidly as possible. Such operating modes are the rotational speeds and torques, or a combination of the two. The rotational speed and/or the torque typically are changed by changing the current through the motor windings from a first value to a second value. The rotational speed or torque then asymptotically approaches the desired rotational speed or desired torque in accordance with the changed winding current.

An improvement can be realized by using a three current method of control. With this method, during the acceleration or deceleration phase, or during a load alternation phase, which requires a change in torque, the motor winding current is appreciably increased, or in the case of a slowdown appreciably decreased, to a second value. As used herein "acceleration" means both increases and decreases in speed. When the desired speed, or torque, is reached, the motor winding current is changed to the final constant value needed to maintain the changed operating parameter. Although three current method results in an improvement over the method which merely changes from one current to another, the method is no longer sufficient because of the increasing demands for rapidity of response and exactness in the operation of electrical appliances.

It is an object of the invention to improve the three current method of controlling appliance motors by decreasing the acceleration and deceleration times and to also quicken the reaction to load alterations.

In order to attain high efficiency in the operation of an electronically corn mutated motor the temporal commutation point is chosen in such a manner that the magnetic field increases or decreases, which are created by changes in the commutating current, are able to exert a maximum attracting or repelling forces on the poles of the motor. During steady operation, the motor winding impedance is highly inductive. Therefore, the magnetic field builds up and decays slowly. In order to enable the magnetic field to reach a maximum value, or minimum value, at exactly the point where the position of the poles allows maximum attracting, or repelling, force the commutation time is placed markedly in advance of the time at which the maximum force occurs.

Patent DE-OS 20 52 695, describes a circuit for controlling an electronically commutated direct current motor. The torque-rotational speed characteristics of the motor, the dimensions of which are predetermined, are changed electronically. The duration of load pulses and their delay in relation to scanning pulses, which are generated using generators coupled with the motor, are regulated by electrical variables, for example, as a function of rotational speed and/or torque of the motor.

During acceleration or a load alteration, the resistance of the motor winding impedance increases and the magnetic field builds up and decays more rapidly. If the commutation times which are valid for idle or steady speed operation were maintained, a displacement of the temporal maximum of the magnetic field in relation to the time for attaining a maximum attracting or repelling force would result, and the attracting or repelling force exerted on the poles would no longer be optimum.

The commutation times of the motor are shifted such that the temporal maximum of the magnetic field coincides with the position of the poles for attaining a maximum speed altering force, that is a maximum attracting or repelling force. This shift improves the efficiency during the acceleration phase or during a load alteration, i.e. the energy input results in an improvement of the acceleration or to a more rapid reaction to load changes.

It is another object of this invention to improve the control of an electronically commutated motor such that more rapid acceleration and deceleration values and faster reactions to load changes, compared to those possible exclusively using changes in the winding current, are attained.

Figure 1:
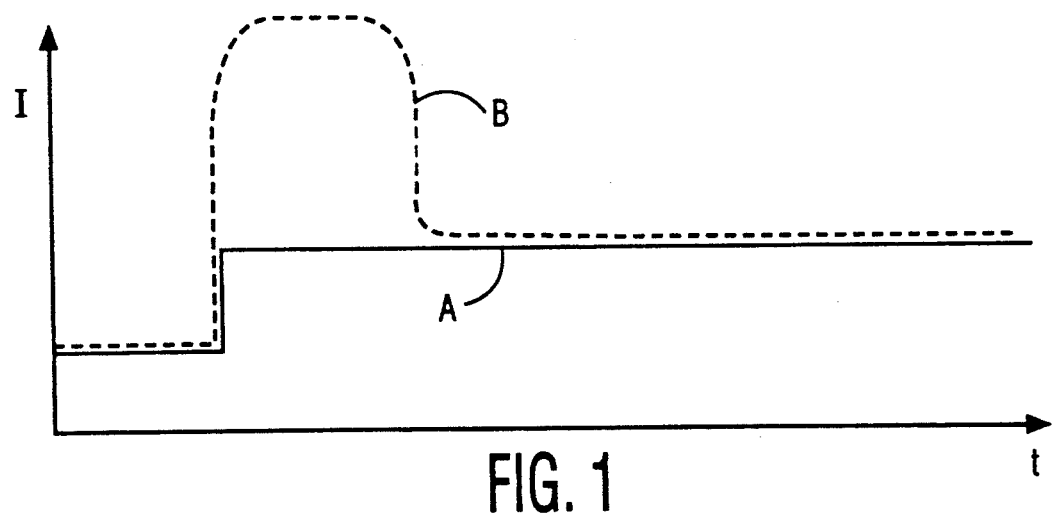
FIG. 1 is a diagram of the winding current in relation to time for different modes of control.
Figure 2:
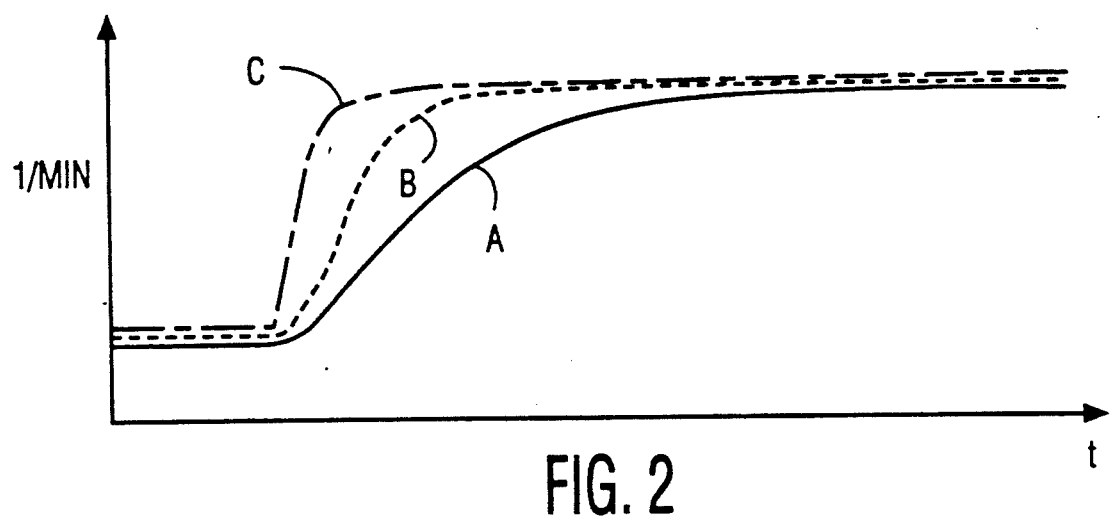
FIG. 2 is a diagram of the motor rotational speed in relation to time for the control modes represented in FIG. 1 and also for the control mode according to the invention.

In FIG. 1, curve A shows a mode of motor control in which the current through the motor winding is increased from a first constant value to a second constant value. The resulting change in the rotational speed of the motor as a result of the change in the winding current is represented in FIG. 2, by curve A. As curve A shows, the rotational speed changes slowly with this type of control, and the desired rotational speed is slowly reached.

Figure 3:
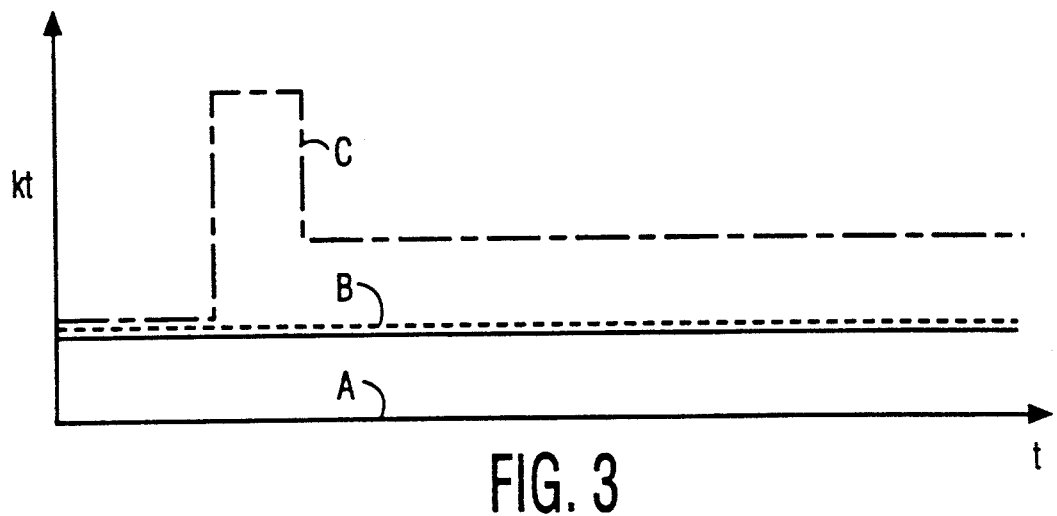
FIG. 3 is a diagram of the commutation time in relation to time.

Another method of control is shown in FIG. 1 by curve B. This is a three current method of operation. During the acceleration phase the current is increased from an initial value to a value appreciably in excess of the final value needed at the desired rotational speed. When the desired speed is reached the current is reduced to the value needed to maintain the speed. The resulting change in the rotational speed of the motor for the three current control method is shown by curve B in FIG. 2. A comparison of curves A and B of FIG. 2 shows that the control method using curve B of FIG. 1 results in a substantially faster attainment of the desired speed than the method using curve A of FIG. 1. However, further improvement in acceleration using a high winding current during the acceleration phase has some practical limits; for example, the magnetic saturation of the iron in the motor, the limited ability to eliminate heat from the winding, the capacity of the current supply, and the interference effects of the current peaks on adjacent components. However, further improvement of the acceleration without these disadvantages is possible. As shown by curve C in FIG. 3, the commutation time is changed during the acceleration phase. Curve C in FIG. 2 shows that the rotational speed of the motor reaches its constant desired value more rapidly than the three current control mode utilizing curve B.

Figure 4:
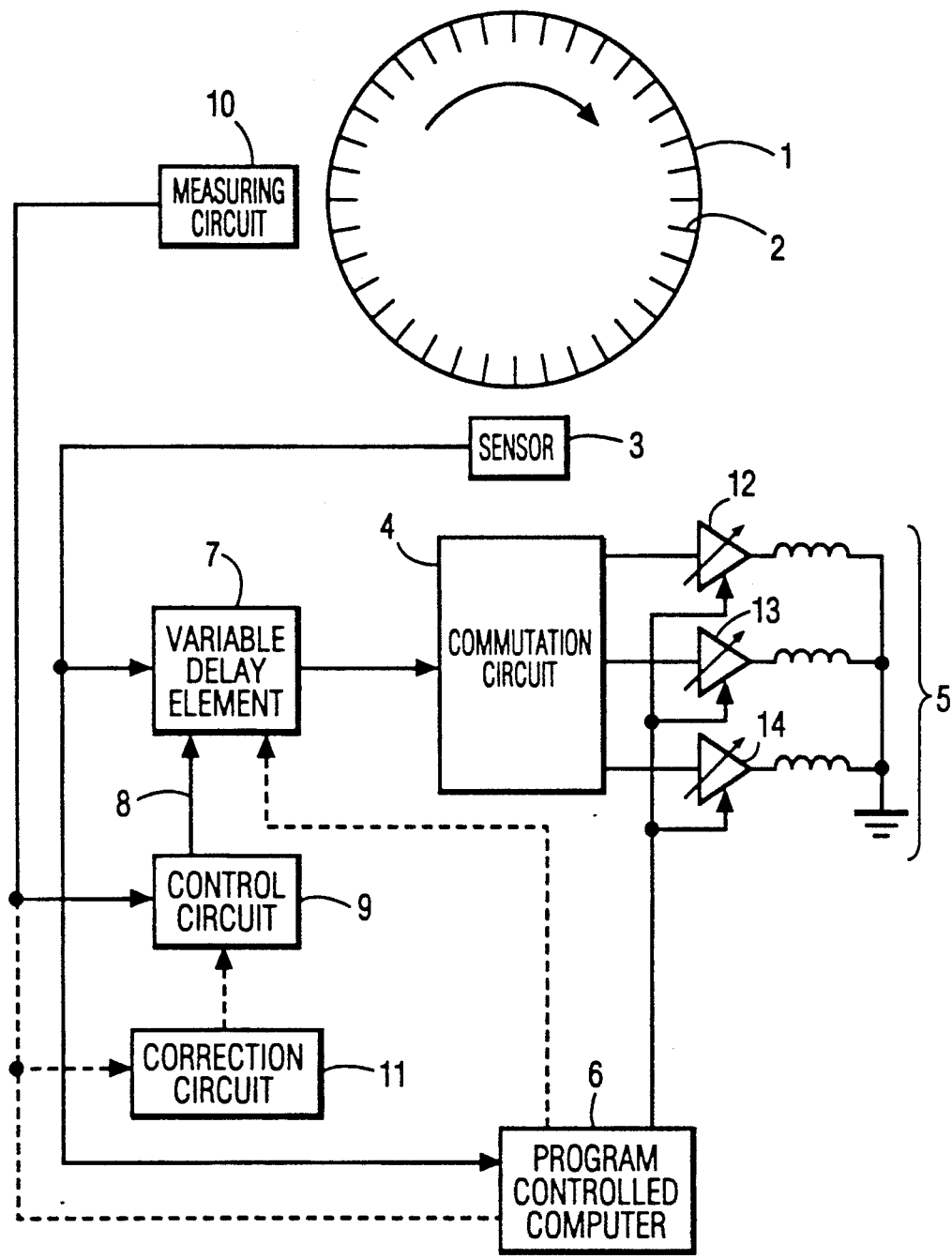
FIG. 4 is a preferred embodiment.

FIG. 4 is a preferred embodiment of the invention. Signals are received from a generator having a generator disc 1 which is coupled to the rotor of the motor. The disc 1 has markings 2 which pass in the vicinity of a sensor 3. The resulting signals are used for commutation and for this purpose are fed to a commutation circuit 4. The commutation circuit 4 turns controllable output stages 12, 13, 14 on and off. The output stages 12, 13 and 14 feed motor windings 5 with a variable current. The commutation current 4 is set to fixed commutation circuit times which result in optimum efficiency of the motor for one mode of operation. In addition, a computer 6 is provided to control the output stages 12, 13, 14 as a function of the signals received from the generator. This computer 6 can also be used to simulate the commutation circuit 4, which is shown here as a discrete unit.

With the invention, a variable delay element 7, which can be in the form of a shift register, is disposed between the sensor 3 and the commutation circuit 4. The shift register 7 has a control input 8 for receiving a correction variable which can influence the delay time. The correction variable is obtained from a control variable by means of a control circuit 9 via a control parameter or, in case of a sequence of parameters, via a control characteristic. The computer 6 can also be used to perform the functions of these components. The variable current feeding the motor windings 5, for example, can be utilized as the control variable. It is also possible to measure the torque which is used at the rotor, and to determine a control variable from this measurement.

The relationship between the control variable and the correction variable, i.e. the control parameter or the control characteristic, can be determined for differing modes of operation in a test sequence. The advantage of an empirical determination lies in the fact that all motor parameters are taken into account automatically and, as a consequence, it is unnecessary to estimate and compute the influence of these parameters. In such a test sequence, the motor designed for a specific application, or a model of the same type of motor is accelerated or decelerated at different commutation times or is subjected to differing loads with steady rotational speed. The optimum commutation times, to which appropriate correction variables of the control circuit 9 correspond, are chosen from the measured acceleration values and load values. This test sequence can also be conducted immediately after the final assembly step of the motor is completed. A measuring circuit 10 makes the measurements at predetermined time intervals, or makes the appropriate measurements upon characteristic changes of the values through aging or misadjustment, and transmits the measured control parameters or control characteristics to the control circuit 9. The updated values are written over the previously stored values. In practice, the functions of circuits 4, 7 and 11 can be performed by the program controlled computer 6.

Improved results can be attained by the provision of a correction circuit 11 which evaluates measuring values of the measuring circuit 10 and transmits correction signals to the control circuit 9. The correction circuit 11 stores the acceleration and/or deceleration values received from the measuring circuit 10. Upon deviations from the original maximum values, preliminary correction signals are transmitted to the control circuit 9, the modified acceleration and/or deceleration values determined later by the measuring circuit 10 as a response are also stored. By comparing the stored values of numerous previous measuring sequences, for example, the tendency of effects of aging of components can be determined. From this determination, a corrected control parameter, or a control characteristic, which is valid over a longer period of time, can be extrapolated and transmitted to the control circuit 9 as a correction signal. The use of such a self-learning circuit eliminates the need for the separate acquisition of appropriate measuring values, which would necessarily require a period of time during which the system would not be in use. The optimum values are reached for each motor of a certain model after a certain transient time. Moreover, there is the advantage that the influences of aging, which would compromise any adjustment originally made by the manufacturer, can be taken into account and compensated automatically. Also, if a discontinuous deterioration should occur, for example, through damage due to shipping or handling of the apparatus, the damage will be recognized immediately after starting operation of the apparatus and correction measures can be initiated immediately.

I claim:

1. A method for controlling an electronically commutated motor by controlling the winding current of said motor, wherein during an operational mode change of said motor said winding current is first changed to a value in excess of the value needed to maintain a motor parameter at a desired level until the desired level of the parameter is reached, and then said winding current is changed to the value needed to maintain said parameter at said desired level, an improvement comprising the steps of:

shifting the commutation time of said motor such that the temporal maximum of the magnetic field of said motor coincides with the position of the motor poles which results in attainment of a maximum parameter altering force:

generating and storing control values in accordance with changes in said parameter during said operational mode changes;

monitoring said parameter during normal operation of said motor and generating additional values in accordance with changes in said parameter;

storing said additional values; and, extrapolating said stored values and providing a corrected parameter.

2. The method of claim 1, further comprising the step of automatically adjusting said parameter each time said motor is turned on.

3. The method of claim 1, further comprising the step of measuring said parameter at selected nine intervals.

4. The method of claim 2, wherein said parameter is acceleration.

5. The method of claim 2, wherein said parameter is motor load.

6. A method for controlling an electronically commutated motor by controlling the winding current of said motor, wherein during an operational mode change of said motor said winding current is first changed to a value in excess of the value needed to maintain a motor parameter at a desired level until the desired level of the parameter is reached, and then said winding current is changed to the value needed to maintain said parameter at said desired level, an improvement comprising the step of shifting the commutation time of said motor such that the temporal maximum of the magnetic field of said motor coincides with the position of the motor poles which results in attainment of a maximum parameter altering force, wherein said parameter is one of acceleration, deceleration, and load changes.

7. In a system for controlling an electronically commutated motor, said system including a generator for providing commutation signals to a commutation circuit, controllable output stages responsive to said commutation signals for varying the winding current of said motor, and a variable delay for providing a correction variable for selectively delaying said commutation signals, an improvement comprising:
- a measuring circuit for measuring a parameter of said motor and providing measured values;
- a control circuit responsive to said measured values for providing a control variable to control said correction variable in response to changes in said parameter; and,
- computer means responsive to said commutation signals for controlling said controllable output stages in accordance with said commutation signals.

8. The improvement of claim 7, further including a correction circuit responsive to said measuring circuit for evaluating said measured values and providing correction signals to change said control variable in accordance with changes in said measured values.

9. The improvement of claim 8, wherein said correction circuit stores said measured values and interpolates said measured values to continuously update said correction variable for characteristic changes in said motor.

10. The improvement of claim 9, wherein said parameter is one of acceleration, deceleration, and load changes.

11. A method for controlling commutation times in an electronically commutated motor as operating levels of motor parameters change during such motor operating modes as acceleration, deceleration and compensation for load variation, comprising the steps of:
- storing a plurality of control values for optimizing said commutation times of said motor at different operating levels of at least one of said motor parameters in at least one of said operating modes;
- successively selecting different ones of said stored control values in accordance with said changing operating levels of said at least one motor parameter during said at least one operating mode; and,
- successively changing said commutation times of said motor in accordance with said succession of said selected control values to optimize said commutation times of said motor during said at least one operating mode.

12. The method of claim 11, comprising the step of selecting said stored control values responsive to changing operating levels of motor winding current.

13. The method of claim 11, comprising the step of periodically and automatically recalculating said stored control values.

14. The method of claim 11, comprising the steps of:
- monitoring actual operating values of said at least one motor parameter at least periodically; and,
- modifying said set of control values upon deviation of said monitored operating values from said stored operating values.

15. The method of claim 11, comprising the steps of:
- storing a set of control values corresponding to a maximum operating level for said at least one motor parameter in each operating mode of said motor;
- monitoring actual maximum operating levels of said motor at least periodically; and,
- modifying said set of control values upon deviation of any one of said monitored actual maximum operating levels from the corresponding stored maximum operating level.

16. The method of claim 11, comprising the steps of:
- storing a set of control values corresponding to a maximum operating level for said at lest one motor parameter in each operating mode of said motor;
- monitoring actual maximum operating levels of said motor at least periodically;
- determining a deviation of any one of said monitored actual maximum operating levels from the corresponding stored maximum operating level and,
- modifying each of said stored control values, before use, by a function related to said determined deviation.

17. An apparatus for controlling commutation times in windings of an electronically commutated motor in such operating modes as acceleration, deceleration and compensation for load variation, comprising:
- a generator for picking up signals used for commutation;
- a commutation circuit;
- controllable output stages, switched by said commutation circuit, for providing a variable current to said motor windings;
- a variable delay element coupled between said generator and said commutation circuit and having a control input; and,
- control means for deriving a correction variable from a value of desired winding current and a value of an actual winding current and supplying said correction variable to said control input of said delay element for controllably delaying said commutation time.

18. The apparatus of claim 17, wherein said value of desired winding current is a function of a stored control value indicative of a desired operating level.

19. The apparatus of claim 18, further comprising measuring means responsive to actual operating levels of said motor and responsive to said stored control value for modifying said desired value of winding current represented by said stored control value to compensate for changes in motor performance over time, said measuring means supplying to said control circuit modified values of said desired winding current necessary to maximize said operating level notwithstanding said changes in performance.

20. The apparatus of claim 18, further comprising:
- means for measuring actual values of said winding current;
- means for storing a measured value of said winding current at a time of necessary operation at a maximum operating level in at least one of said modes and for storing a control value corresponding to a value of desired winding current needed for maximizing said operating level in said at least one of said operating modes; and,
- means for modifying said stored control value when said measured value of said winding current at the time of necessary operation at the maximum operating level differs from said desired winding current needed for maximizing said operating level.

21. The apparatus of claim 18, further comprising:
- means for measuring actual values of said winding current;
- means for storing a measured value of said winding current at a time of necessary operation at a maximum operating level in at least one of said modes and for storing a control parameter corresponding to a value of desired winding current needed for maximizing said operating level in said at least one of said operating modes; and, means for modifying said correction variable when said measured value of said winding current at the time of necessary operation at the maximum operating level differs from said desired winding current needed for maximizing said operating level.

* * * * *